United States Patent Office 2,922,434
Patented Jan. 26, 1960

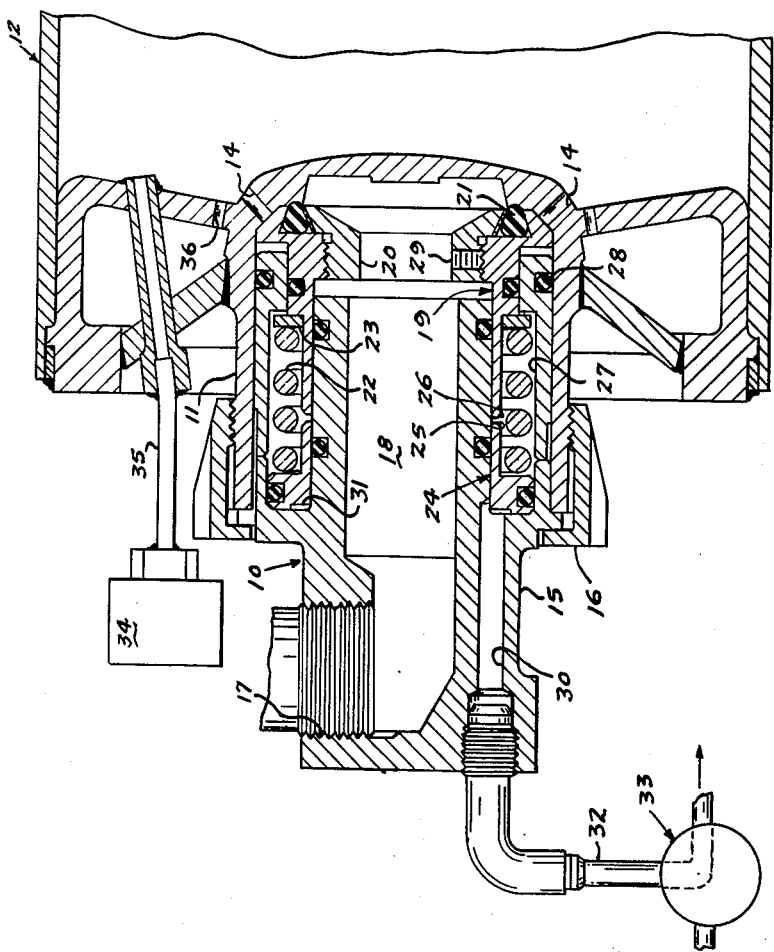

2,922,434

SHUT-OFF VALVE

John R. Prybylski, Buffalo, and Clement J. Turansky, Tonawanda, N.Y., assignors to the United States of America as represented by the Secretary of the Air Force Application April 19, 1956, Serial No. 579,409

1 Claim. (Cl. 137—487.5)

The invention described herein may be manufactured and used by or for the Government for governmental purposes without the payment of any royalty thereon.

This invention relates to a shut-off valve and, more particularly, to a shut-off valve that stops the flow of fluid therethrough either in response to a drop in the pressure of the fluid flowing therethrough or in response to a sudden change in the pressure in the container to which the fluid is flowing.

The combustion chamber of a rocket engine is at a very high temperature during its operation. If the fuel supply to the combustion chamber ceases due to a malfunction in the fuel line such as caused by water or dirt in the line, for example, the flame in the combustion chamber ceases to burn suddenly. Then, if the fuel flow resumes as a result of the malfunction in the fuel line being eliminated, the fuel comes in contact with the hot walls of the combustion chamber and the possibility of an explosion therein exists. Such an explosion creates a danger since the engine might easily be demolished as a result thereof. The present invention eliminates this danger since the shut-off valve instantly cuts off the fuel supply if there is any sudden drop of pressure in the combustion chamber.

Another danger in operating a rocket engine is the possibility of the fuel dripping from the injector head into the combustion chamber after shutdown. If sufficient fuel accumulates in the combustion chamber due to dripping from the injector head and such fuel comes into contact with the oxidizer, an explosion may result therefrom and possibly demolish the rocket engine. The present invention prevents the fuel from dripping into the combustion chamber after shutdown since it closes as soon as the fuel pressure flowing therethrough drops to a predetermined value.

An object of this invention is to provide a shut-off valve that stops the fluid flow therethrough in response to a drop in pressure of the fluid flowing therethrough.

Another object of this invention is to provide a shut-off valve that stops fluid flow therethrough when the pressure condition in the container to which the fluid is flowing changes a predetermined amount.

Other objects of this invention will be readily perceived from the following description.

This invention relates to a valve including a housing having an inlet and an outlet. The flow of fluid through the outlet from the inlet is controlled by means in the housing. Resilient means hold the control means in a position to close the outlet. The fluid flowing through the housing is directed against the control means to overcome the force of the resilient means to move the control means to open the outlet. The resilient means moves the control means to its closed position when the pressure of the fluid flowing through the housing decreases to a predetermined value.

The single figure of the attached drawing is a sectional view of the preferred embodiment of the present invention.

Referring to the drawing, there is shown a valve housing 10 having a portion 11 attached to a container 12 such as a combustion chamber of a rocket engine, for example. The portion 11 has a plurality of outlets 14 (two of which are shown) connecting the interior of the valve housing 10 with the interior of the combustion chamber. A second portion 15 of the valve housing 10 is attached to the first portion 11 by a nut 16, which is screwed onto the end of the first portion 11.

The second portion 15 of the valve housing 10 has an inlet 17 connected to a suitable source of fluid (not shown). The valve housing 10 has a passage 18 extending through the second portion 15 from the inlet 17. A piston member 19, which is movable in the annular space between the second portion 15 and the first portion 11 of the valve housing 10, controls the flow of fluid from the passage 18 through the outlets 14. A retainer 20 is threaded onto the end of the piston member 19 adjacent the outlets 14 to hold a packing 21 against a portion of the piston member 19 whereby the outlets 14 are sealed from the passage 18. The piston member 19 is held in its closed position by resilient means such as a spring 22 acting against a portion of the piston member 19 through a spacer 23.

A second piston member 24 is disposed between the end of the spring 22 remote from the spacer 23 and the second portion 15 of the valve housing 10. The second piston member 24 has a flange 25 spaced a predetermined distance from a flange 26 of the piston member 19. This spacing of the flanges is determined by the distance it is desired for the piston member 19 to move from the outlets 14. The preferred amount of travel of the piston member 19 is such that the outlets 14 are completely open for free flow from the passage 18 therethrough and yet the piston member 19 is close enough to the outlets 14 to close them rapidy when desired.

A sleeve 27 is disposed between the spring 22 and the first portion 11 of the valve housing 10. This sleeve not only serves to maintain the spring 22 between the two piston members but also prevents any fluid leakage since the sleeve has a packing 28 between it and the wall of the portion 11 of the valve housing 10.

As is readily observed, the retainer 20 has a slanting surface exposed to the fluid pressure in the passage 18. The fluid pressure acting against the surface of the retainer 20 produces the force necessary to overcome the force of the spring 22 to move the piston member 19 away from the outlets 14. A set screw 29 holds the retainer 20 in its desired threaded position on the piston member 19.

The second portion 15 of the valve housing 10 has a passage 30 communicating with a small chamber 31, which is between the end of the second piston member 24 and the wall of the second portion 15 of the valve housing. A conduit 32 connects the passage 30 with a source of fluid under pressure (not shown). The fluid flow through the conduit 32 is controlled by a solenoid valve 33, which either connects the chamber 31 with the fluid source or vents the chamber to the atmosphere. Obviously, when fluid is supplied to the small chamber 31, the pressure of the fluid acting against the piston member 19 through the second piston member 24 and the spring 22 plus the force of the spring 22 combine to move the piston member 19 rapidly to close the outlets 14.

The solenoid valve 33 is energized only when a pressure switch 34 is closed. A conduit 35 connects the pressure switch 34 with the interior of the container 12. The pressure switch 34 closes only when the pressure condition within the interior of the container 12 has a predetermined change; when the valve is used with the combustion chamber of a rocket engine, it is a predetermined decrease that closes the switch. When this change occurs, the closing of the pressure switch 34 energizes the solenoid valve 33 to connect the conduit 32 with the source of fluid. The supplying of the fluid to the small chamber 31 acts through the second piston member 24 and the spring 22 against the piston member 19 to combine with the force of the spring 22 whereby the piston member 19 quickly closes the outlets 14.

Considering the operation of the present invention, a fluid such as a liquid fuel for the combustion chamber of a rocket engine is supplied through the inlet 17 to the passage 18 of the valve housing 10. The pressure of the fluid acts against the slanting surface of the retainer 20 to exert a force against the piston member 19 to overcome the force of the spring 22 and move the piston member 19 to open the outlets 14. The fluid then flows through the outlets 14 into the container 12, which in this example is the combustion chamber of a rocket engine. When the valve of the present invention is used with a combustion chamber, the first portion 11 of the valve housing 10 serves as an injector head and the outlets 14 function as fuel nozzles. However, it will be understood that the portion 11 of the valve housing 10 is considered as a fuel injector merely for the purposes of this specific example. In order for there to be combustion in the combustion chamber, an oxidizer must also be supplied to the combustion chamber. While this oxidizer could be mixed with the liquid fuel outside the combustion chamber if the two propellants were of the type that may be mixed without combustion, the first portion 11 of the valve housing 10 is shown having orifices 36 for the admission of an oxidizer to the interior of the combustion chamber 12.

If it should be desired to stop combustion in the combustion chamber of the rocket engine, the supply of fuel thereto is stopped by preventing flow of fuel to the inlet 17. This, of course, quickly reduces the pressure in the fluid passage 18 of the valve housing 10 whereby the spring 22 overcomes the force of the fluid acting against the piston member 19 to move the piston member 19 to its closed position whereby the outlets 14 are closed. Since the spring 22 exerts a continuous force on the piston member 19, it will be noted that this results in an automatic closing of the outlets 14 as soon as the pressure starts to drop in the fluid passage 18. This quick closing of the outlets 14 prevents fuel from dripping into the combustion chamber after the engine has been shutdown to thereby prevent an accumulation of fuel in the combustion chamber where it would come into contact with the oxidizer after shutdown to possibly create an explosion. By limiting the amount of travel of the piston member 19 when the outlets 14 are open through the engagement of the flange 25 of the second piston member 24 with the flange 26 of the piston member 19, the piston member 19 is only a short distance from the outlets 14 and quick closure is therefore possible.

If the flame in the combustion chamber ceases to exist for any reason, there is a sudden pressure drop in the combustion chamber that is transmitted through the conduit 35 to close the pressure switch 34. The closing of the pressure switch 35 energizes the solenoid valve 33 to supply fluid under pressure through the conduit 32 to the small chamber 31. This fluid acts against the second piston member 24, as previously explained, to combine with the force of the spring 22 to quickly move the piston member 19 to its closed position to stop the supply of fuel to the combustion chamber. This prevents fuel from continuously flowing into the combustion chamber after the flame ceases to exist. It will be obvious that if the fuel did come into contact with the hot walls of the combustion chamber, an explosion might result whereby the engine might be demolished creating a danger to both life and property.

While any fluid may be supplied to the small chamber 31, it is preferable in a rocket engine to use the same fluid that operates other hydraulic devices. It will be understood that the passage 30 may be plugged, if desired, so that the valve only closes when the pressure of the fluid flowing through the passage 18 decreases to a predetermined value. The passage 30 would be closed whenever it was not desired to have the valve closed in response to a predetermined pressure change in the container to which the valve is supplying fluid.

While the operation of the valve has been described with reference to the combustion chamber of a rocket engine, it will be understood that this shut-off valve may be employed anywhere that it is desired to stop fluid flow when the pressure of the fluid passing through the valve housing falls to a predetermined value. Similarly, this valve housing may be employed whenever it is desired merely to stop the flow of fluid to a container when a predetermined pressure condition exists in the container; for example, this valve could easily be employed to stop the supply of a fluid to a container when the pressure in the container reached a certain value beyond which it might rupture the container.

An advantage of the present invention is that it prevents an explosion on shutdown of a rocket engine due to the accumulation of fuel and oxidizer in the combustion chamber. Another advantage of this invention is that it produces smoother shutdowns of rocket engines by positively stopping the fuel supply thereto.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

In combination, a container, a valve to control the supply of fluid to the container, the valve including a housing having a passage therein, said housing having an inlet communicating with one end of the passage, said housing having an outlet connecting the other end of the passage with the container, piston means movable within the housing to open and close the outlet, said piston means including a piston, a packing, and a retainer secured to the piston and holding the packing against one end of the piston, resilient means holding the piston means in its closed position by urging the packing against the housing to prevent fluid flow from the passage to the outlet, said piston means overcoming the resilient means to move to its open position in response to a predetermined pressure in the passage acting against the retainer, and means responsive to a predetermined pressure condition in the container to move the piston means to its closed position.

References Cited in the file of this patent

UNITED STATES PATENTS

| | | |
|---|---|---|
| 62,477 | Coppin | Feb. 26, 1867 |
| 1,502,739 | Munzinger | July 29, 1924 |
| 1,690,097 | Ackermann | Nov. 6, 1928 |
| 2,491,821 | Lerstrup | Dec. 20, 1949 |
| 2,575,677 | Neu | Nov. 20, 1951 |
| 2,646,932 | Frost | July 28, 1953 |